United States Patent
Lim et al.

(10) Patent No.: US 10,038,993 B2
(45) Date of Patent: Jul. 31, 2018

(54) METHOD FOR SUPPORTING DEVICE-TO-DEVICE COMMUNICATION IN A CELLULAR NETWORK, AND APPARATUS FOR SAME

(75) Inventors: Dongguk Lim, Anyang-si (KR); Jiwoong Jang, Anyang-si (KR); Hangyu Cho, Anyang-si (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 14/239,993

(22) PCT Filed: Aug. 30, 2012

(86) PCT No.: PCT/KR2012/006954
§ 371 (c)(1),
(2), (4) Date: Feb. 20, 2014

(87) PCT Pub. No.: WO2013/032251
PCT Pub. Date: Mar. 7, 2013

(65) Prior Publication Data
US 2014/0185529 A1    Jul. 3, 2014

Related U.S. Application Data (60) Provisional application No. 61/528,764, filed on Aug. 30, 2011.

(51) Int. Cl.
*H04W 8/00* (2009.01)
*H04W 76/14* (2018.01)
(Continued)

(52) U.S. Cl.
CPC ........... *H04W 8/005* (2013.01); *H04W 76/14* (2018.02); *H04W 28/06* (2013.01); *H04W 72/12* (2013.01)

(58) Field of Classification Search
CPC ...... H04W 40/24; H04W 48/16; H04W 8/005
See application file for complete search history.

(56) References Cited

U.S. PATENT DOCUMENTS 8,521,194 B2* 8/2013 Laroia et al. ................. 455/458
2007/0026794 A1* 2/2007 Ayyagari ............... H04L 41/00
455/11.1
(Continued)

FOREIGN PATENT DOCUMENTS

CN          101300743       11/2008
JP          2010193288      9/2010
(Continued)

OTHER PUBLICATIONS

PCT International Application No. PCT/KR2012/006954, Written Opinion of the International Searching Authority dated Feb. 25, 2013, 18 pages.

(Continued)

*Primary Examiner* — Charles C Jiang
*Assistant Examiner* — Thad Defauw
(74) *Attorney, Agent, or Firm* — Lee Hong Degerman Kang Waimey (57) ABSTRACT

Disclosed are a method for supporting device-to-device (D2D) communication in a cellular network, and an apparatus for same. The method for supporting device-to-device communication by a terminal in a cellular network comprises the steps of: the terminal receiving, from a base station, information on a D2D zone which has been set up for the D2D communication; and monitoring the D2D zone, using the information on the D2D zone, to detect a search signal transmitted by at least one D2D terminal, wherein the D2D zone may comprise: a search section for the transmission of the search signal by the at least one D2D terminal;
(Continued)

and a connection section for transmission of a signal for requesting D2D transmission.

15 Claims, 6 Drawing Sheets

(51) Int. Cl.
*H04W 28/06* (2009.01)
*H04W 72/12* (2009.01)

(56) References Cited

U.S. PATENT DOCUMENTS

| | | | |
|---|---|---|---|
| 2007/0105592 A1 | 5/2007 | Kang et al. | |
| 2009/0017843 A1 | 1/2009 | Laroia et al. | |
| 2009/0023460 A1* | 1/2009 | Cho | H04W 4/02 455/456.2 |
| 2013/0142268 A1* | 6/2013 | Gao | H04L 5/14 375/252 |
| 2013/0170470 A1* | 7/2013 | Kneckt | H04W 72/0446 370/330 |
| 2014/0235293 A1* | 8/2014 | Sheldon | A61B 5/0205 455/556.1 |
| 2015/0094830 A1* | 4/2015 | Lipoma | G05B 15/02 700/90 |
| 2015/0148636 A1* | 5/2015 | Benaron | A61B 5/0059 600/328 |
| 2015/0172893 A1* | 6/2015 | St. Germain | H04W 4/22 455/404.2 |
| 2015/0181325 A1* | 6/2015 | Urup | H04R 1/1091 381/74 |
| 2015/0185883 A1* | 7/2015 | S | G06F 3/0488 345/173 |
| 2015/0301031 A1* | 10/2015 | Zin | G01N 33/48792 436/164 |
| 2015/0371215 A1* | 12/2015 | Zhou | G06Q 30/02 705/71 |

FOREIGN PATENT DOCUMENTS

| | | | |
|---|---|---|---|
| KR | 20090062435 | * | 6/2009 |
| KR | 1020090062435 | | 6/2009 |
| WO | 2009009394 | | 1/2009 |

OTHER PUBLICATIONS

The State Intellectual Property Office of the People's Republic of China Application No. 201280042695.9, Office Action dated Apr. 20, 2016, 24 pages.

* cited by examiner

METHOD FOR SUPPORTING DEVICE-TO-DEVICE COMMUNICATION IN A CELLULAR NETWORK, AND APPARATUS FOR SAME

CROSS-REFERENCE TO RELATED APPLICATIONS

This application is the National Stage filing under 35 U.S.C. 371 of International Application No. PCT/KR2012/006954, filed on Aug. 30, 2012, which claims the benefit of U.S. Provisional Application Ser. No. 61/528,764, filed on Aug. 30, 2011, the contents of which are all hereby incorporated by reference herein in their entirety.

TECHNICAL FIELD

The present invention relates to wireless communication and, more particularly, to a method for supporting device-to-device (D2D) communication in a cellular network and an apparatus therefor.

BACKGROUND ART

Recently, with the spread of smartphones and tablet PCs and activation of high-capacity multimedia communication, mobile traffic has significantly increased. Future mobile traffic is expected to increase by about twice current mobile traffic each year. Since most mobile traffic is transmitted through a base station (BS), communication service operators are being confronted with serious network load. To process increasing traffic, communication operators have installed networks and have hurried commercialization of next-generation mobile communication standard, such as mobile WiMAX or long term evolution (LTE), capable of efficiently processing large amounts of traffic. However, another solution is required to cope with greater amounts of traffic in the future.

D2D communication refers to decentralized communication technology for directly transmitting traffic between continuous nodes without using an infrastructure such as a BS. In a D2D communication environment, each node of a portable device, etc. searches for physically adjacent devices, configures a communication session, and transmits traffic. Since such D2D communication is being spotlighted as elementary technology of next-generation mobile communication after 4G due to its traffic overload solving ability by distributing traffic converging towards the BS. For this reason, a standardization institute such as 3rd generation partnership (3GPP) or institute of electrical and electronics engineers (IEEE) is establishing D2D communication standard based on LTE-advanced (LTE-A) or Wi-Fi and Qualcomm etc. have developed independent D2D communication technology.

D2D communication is expected not only to contribute to increased performance of a mobile communication system but also to create a new communication service. Further, an adjacency based social network service or a network game service can be supported. A connectivity problem of a device in a shadow area can be overcome using a D2D link as a relay. Thus, D2D technology is expected to provide new services in various fields.

In fact, D2D communication, such as infrared communication, ZigBee, radio frequency identification (RFID), and near field communication (NFC) based on RFID, has already been widely used. However, strictly speaking, it is difficult for these technologies to be classified as D2D communication for decentralizing traffic of a BS because they support only special communication purposes within a significantly limited distance (around 1 m).

While D2D communication has been described hereinabove, a D2D frame structure for efficiently performing D2D communication in a cellular network or a method for performing D2D communication has not been proposed in detail up to now.

DETAILED DESCRIPTION OF THE INVENTION

Technical Problems

A technical object to be achieved by the present invention is to provide a method for supporting D2D communication in a cellular network.

Another technical object to be achieved by the present invention is to provide a user equipment (UE) for supporting D2D communication in a cellular network.

The technical objects that can be achieved through the present invention are not limited to what has been particularly described hereinabove and other technical objects not described herein will be more clearly understood by persons skilled in the art from the following detailed description.

Technical Solutions

The technical object of the present invention can be achieved by providing a method for supporting device-to-device (D2D) communication by a user equipment in a cellular network, including receiving information about a D2D zone configured for D2D communication from a base station; and detecting a discovery signal transmitted by at least one D2D user equipment by monitoring the D2D zone using the information about the D2D zone, wherein the D2D zone includes a discovery interval for transmitting the discovery signal and a connection interval for transmitting a D2D transmission request signal, by the at least one D2D user equipment. The information about the D2D zone may include at least one of D2D zone configuration information, D2D zone allocation period information, D2D zone start point information, D2D zone length information, and D2D zone switch information. The information about the D2D zone may be received through a downlink broadcast channel, a common search space of a downlink control channel, an additional broadcast channel for D2D communication, or higher-layer signaling.

The method may further include acquiring at least one of received signal power information of the discovery signal, signal-to-noise ratio (SNR) information, and interference level information of the discovery signal by measuring the discovery signal transmitted by the at least one D2D user equipment, detected in the D2D zone; and generating a list of neighboring D2D user equipments based on the acquired information. The method may further include transmitting information about the generated list of the neighboring D2D user equipments to the base station, wherein the information about the list of the neighboring D2D user equipments includes at least one of identifiers of D2D user equipments adjacent to the user equipment, received signal power information of discovery signals transmitted by the neighbor D2D user equipments, SNR information, and interference level information of the neighbor D2D user equipments. The neighbor D2D user equipments may be neighbor D2D user equipments transmitting transmission request signals to perform D2D communication. The neighbor D2D user equipments may be user equipments currently performing D2D communication. The method may further include receiving information about a threshold value of the discovery signal from the base station, wherein the list of the neighboring D2D user equipments is generated by further considering the information about the threshold value in addition to the acquired information. The neighbor D2D user equipments included in the information about the list of the D2D user equipments may be D2D UEs having a received signal power level, an SNR, or an interference level exceeding the threshold value.

The other technical object of the present invention can be achieved by providing a user equipment for supporting device-to-device (D2D) communication in a cellular network, including a receiver configured to receive information about a D2D zone configured for D2D communication from a base station; and a processor configured to detect a discovery signal transmitted by at least one D2D user equipment by monitoring the D2D zone using the information about the D2D zone, wherein the D2D zone includes a discovery interval for transmitting the discovery signal and a connection interval for transmitting a D2D transmission request signal, by the at least one D2D user equipment. The processor may acquire at least one of received signal power information of the discovery signal, signal-to-noise ratio (SNR) information, and interference level information of the discovery signal by measuring the discovery signal transmitted by the at least one D2D user equipment, detected in the D2D zone and generate a list of neighboring D2D user equipments based on the acquired information. The user equipment may further include a transmitter configured to transmit information about the generated list of the neighboring D2D user equipments to the base station, wherein the information about the list of the neighboring D2D user equipments generated by the processor includes at least one of identifiers of D2D user equipments adjacent to the user equipment, received signal power information of discovery signals transmitted by the neighbor D2D user equipments, SNR information, and interference level information of the neighbor D2D user equipments. The receiver may be configured to further receive information about a threshold value of the discovery signal from the base station and the processor may be configured to generate the list of the neighboring D2D user equipments by further considering the information about the threshold value in addition to the acquired information. The user equipment may be a D2D user equipment performing D2D communication or a cellular user equipment of a cellular network.

Advantageous Effects

According to various embodiments of the present invention, a BS can efficiently perform scheduling based on list information about neighbor D2D UEs received from a D2D UE or a cellular UE and, as a result, the D2D UE can efficiently perform D2D communication using allocated resources.

Effects according to the present invention are not limited to what has been particularly described hereinabove and other advantages not described herein will be more clearly understood by persons skilled in the art from the following detailed description of the present invention.

DESCRIPTION OF DRAWINGS

The accompanying drawings, which are included to provide a further understanding of the invention, illustrate embodiments of the invention and together with the description serve to explain the principle of the invention.

BEST MODE FOR CARRYING OUT THE INVENTION

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. For example, although the following detailed description is given under the assumption of a 3GPP LTE system as a mobile communication system, it is applicable to other mobile communication systems except for matters that are specific to the 3GPP LTE system.

In some instances, known structures and devices are omitted or are shown in block diagram form, focusing on important features of the structures and devices, so as not to obscure the concept of the present invention. The same reference numbers will be used throughout this specification to refer to the same parts.

The following description assumes that a user equipment (UE) refers to a mobile or fixed user equipment such as a mobile station (MS) or an advanced mobile station (AMS) and a base station (BS) refers to an arbitrary node of a network stage communicating with a UE, such as a Node B, an eNode B, or an access point (AP). Although this specification is described based on an IEEE 802.16 system, the disclosure of the present invention is applicable to various communication systems.

In a mobile communication system, a UE may receive information on downlink from an eNB, and the UE may transmit information on uplink. Information transmitted and received by the UE includes data and various control information. A variety of physical channels are present according to types or usages of information transmitted or received by the UE.

The following technique can be applied to a variety of radio access systems, for example, code division multiple access (CDMA), frequency division multiple access (FDMA), time division multiple access (TDMA), orthogonal frequency division multiple access (OFDMA), single carrier frequency division multiple access (SC-FDMA), and the like. CDMA may be embodied through radio technology such as universal terrestrial radio access (UTRA) or CDMA2000. TDMA may be embodied through radio technology such as global system for mobile communications (GSM)/general packet radio service (GPRS)/enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802-20, and evolved UTRA (E-UTRA). UTRA is a part of a universal mobile telecommunications system (UMTS). 3rd generation partnership project (3GPP) long term evolution (LTE) is part of evolved UMTS (E-UMTS) using E-UTRA. 3GPP LTE employs OFDMA in DL and employs SC-FDMA in UL. LTE-advanced (LTE-A) is an evolved version of 3GPP LTE.

Specific terms used in the following description are proposed to aid in understanding the present invention, and the use of these specific terms may be changed to another format within the technical scope or spirit of the present invention.

Figure 1:
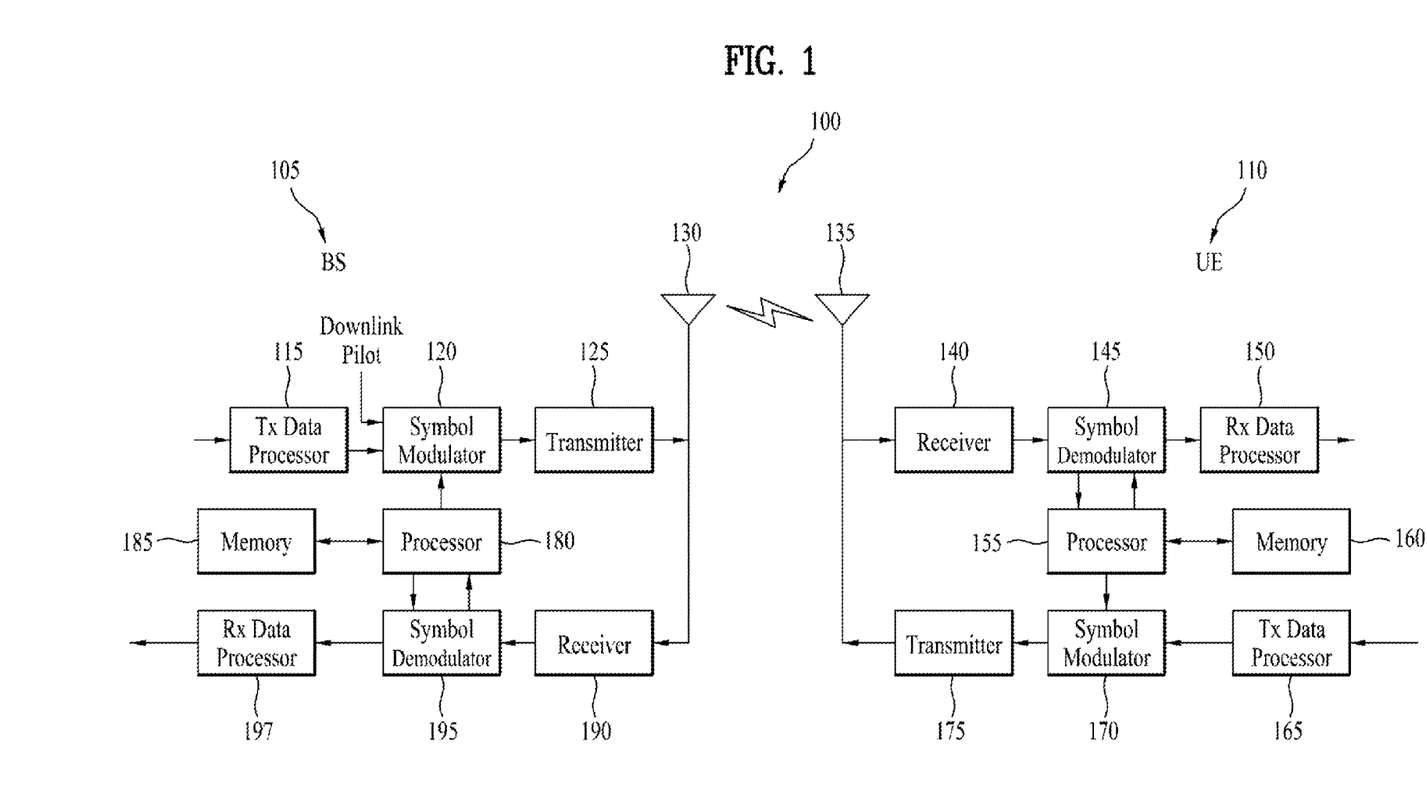
FIG. 1 is a block diagram illustrating the configuration of a BS 105 and a UE 110 in a wireless communication system 100.

FIG. 1 is a block diagram illustrating the configuration of a BS 105 and a UE 110 in a wireless communication system 100.

One BS 105 and one UE 110 (including a D2D UE) are illustrated to simplify the wireless communication system 100. However, the wireless communication system 100 may include more than one BS and/or more than one UE.

Referring to FIG. 1, the BS 105 may include a transmission (Tx) data processor 115, a symbol modulator 120, a transmitter 125, a transmission/reception (Tx/Rx) antenna 130, a processor 180, a memory 185, a receiver 190, a symbol demodulator 195, and an Rx data processor 197. The UE 110 may include a Tx data processor 165, a symbol modulator 170, a transmitter 175, a Tx/Rx antenna 135, a processor 155, a memory 160, a receiver 140, a symbol demodulator 145, and an Rx data processor 150. Although one antenna 130 and one antenna 135 are depicted in the BS 105 and the UE 110, respectively, each of the BS 105 and the UE 110 includes a plurality of antennas. Accordingly, the BS 105 and the UE 110 according to the present invention support a multiple input multiple output (MIMO) system. The BS 105 according to the present invention may support both a single user-MIMO (SU-MIMO) scheme and a multi user-MIMO (MU-MIMO) scheme.

On downlink, the Tx data processor 115 receives, formats, codes, interleaves, and modulates (or symbol maps) traffic data and provides modulated symbols ("data symbols"). The symbol modulator 120 receives and processes the data symbols and pilot symbols and provides a stream of symbols.

The symbol modulator 120 multiplexes the data and pilot symbols and transmits the multiplexed symbols to the transmitter 125. Each transmission symbol may be a data symbol, a pilot symbol, or a signal value of zero. Pilot symbols may be sent successively in each symbol period. The pilot symbols may be frequency division multiplexed (FDM), orthogonal frequency division multiplexed (OFDM), time division multiplexed (TDM), or code division multiplexed (CDM) symbols.

The transmitter 125 receives and converts the stream of symbols into one or more analog signals and further coordinates (e.g., amplifies, filters, and frequency up-converts) the analog signals to generate downlink signals suitable for transmission over a radio channel. The downlink signals are then transmitted through the antenna 130 to the UE.

In the configuration of the UE 110, the antenna 135 receives the downlink signals from the BS 105 and provides the received signals to the receiver 140. The receiver 140 coordinates (e.g., filters, amplifies, and frequency down-converts) the received signals and digitizes the coordinated signals to obtain samples. The symbol demodulator 145 demodulates received pilot symbols and provides the demodulated pilot symbols to the processor 155 for channel estimation.

The symbol demodulator 145 receives a frequency response estimate for downlink from the processor 155, performs data demodulation upon received data symbols to obtain data symbol estimates (which are estimates of transmitted data symbols), and provides the data symbol estimates to the Rx data processor 150. The Rx data processor 150 demodulates (e.g., symbol demaps), deinterleaves, and decodes the data symbol estimates to recover the transmitted traffic data.

Processing by the symbol demodulator 145 and the Rx data processor 150 is complementary to processing by the symbol modulator 120 and the Tx data processor 115, respectively, in the BS 105.

On uplink, the Tx data processor 165 of the UE 110 processes traffic data and provides data symbols. The symbol modulator 170 receives and multiplexes the data symbols, performs modulation, and provides a stream of symbols to the transmitter 175. The transmitter 175 then receives and processes the stream of symbols to generate uplink signals, which are transmitted through the antenna 135 to the BS 105.

In the BS 105, the uplink signals from the UE 110 are received through the antenna 130 and the receiver 190 processes the received uplink signals to obtain samples. The symbol demodulator 195 then processes the samples and provides received pilot symbols and data symbol estimates for uplink. The Rx data processor 197 processes the data symbol estimates to recover traffic data transmitted from the UE 110.

The processors 155 and 180 of the UE 110 and the BS 105 direct (e.g., control, coordinate, manage, etc.) operation at the UE 110 and the BS 105, respectively. The respective processors 155 and 180 may be connected to the memories 160 and 185 that store program code and data. The memories 160 and 185 are connected to the processor 180 to store operating systems, applications, and general files.

The processors 155 and 180 may be referred to as controllers, microcontrollers, microprocessors, microcomputers, etc. Meanwhile, the processors 155 and 180 may be implemented by hardware, firmware, software, or combinations thereof. When embodiments of the present invention are achieved using hardware, application specific integrated circuits (ASICs), digital signal processors (DSPs), digital signal processing devices (DSPDs), programmable logic devices (PLDs), or field programmable gate arrays (FPGAs), which are configured to perform the present invention, may be included in the processors 155 and 180.

On the other hand, when embodiments of the present invention are implemented using firmware or software, firmware or software may be configured to include a module, a procedure, a function, etc. performing functions or operations of the present invention. The firmware or software configured to perform the present invention may be included in the processors 155 and 180 or stored in the memories 160 and 185 so as to be executed by the processors 155 and 180.

Layers of a radio interface protocol between a UE/BS and a radio communication system (network) may be divided into a first layer (L1), a second layer (L2), and a third layer (L3), based on the three lowest layers of an open systems interconnection (OSI) model widely known in the art of communication systems. A physical layer belongs to the first layer and provides information transfer services through a physical channel. A radio resource control (RRC) layer belongs to the third layer and provides control radio resources between the UE and the network. The UE/BS may exchange RRC messages with the radio communication network through the RRC layer.

Hereinafter, a method is proposed for performing transmission by receiving a resource (or band) allocated to transmit data to another UE through centralized scheduling in the case in which a UE performs device-to-device communication (hereinafter, referred to as D2D communication or D2D direct communication). Although such a proposed method will be described based on 3GPP LTE/LTE-A by way of example for a detailed explanation, the method may be applied to other communication systems (IEEE 802.16, WiMAX, etc.).

Figure 2:
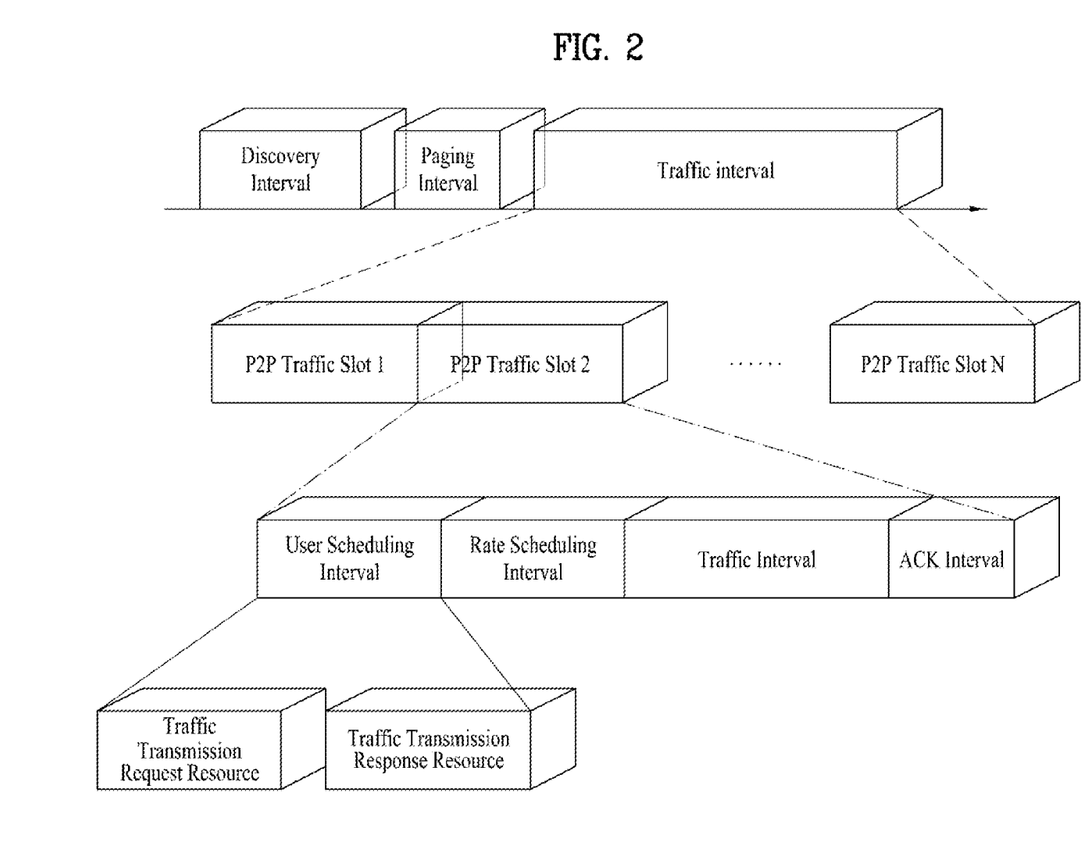
FIG. 2 is a diagram illustrating a frame structure for D2D communication.

In the present invention, a UE performs D2D communication using a frame structure as illustrated in FIG. 2.

As mentioned earlier, D2D communication has an architecture for directly transmitting and receiving signals between UEs that desire to transmit data without passing through a BS or a relay node. Accordingly, signals are transmitted and received using a channel and resource determined between the UEs without control of the BS and a frame structure for such an operation is needed. An example of the frame structure is illustrated in FIG. 2.

FIG. 2 is a diagram illustrating an exemplary frame structure for D2D communication.

Hereinafter, a UE that can perform D2D communication or performs D2D communication is referred to as a D2D UE. The D2D UE may perform D2D communication using a D2D communication frame structure as illustrated in FIG. 2. The D2D communication frame structure illustrated in FIG. 2 may include a discovery interval, a paging interval, and a traffic interval. The traffic interval may include a plurality of P2P traffic slots, each P2P traffic slot including a user scheduling interval, a rate scheduling interval, a traffic interval, and an acknowledgement (ACK) interval. The user scheduling interval may include a traffic transmission request resource and a traffic transmission response resource.

The D2D UE performing D2D communication using the frame structure illustrated in FIG. 2 may perform discovery using the discovery interval in a frame in order to detect UEs within a range within which the D2D UE is capable of transmitting and receiving signals. The discovery interval including a plurality of logical channels or tones is commonly used by D2D UEs and may be periodically present in the frame.

Prior to transmission of a discovery signal, the D2D UE may receive discovery signals transmitted by other D2D UEs by monitoring the logical channels of the discovery interval. Upon receiving the discovery signals transmitted by other D2D UEs, the D2D UE may compose a D2D UE list using the discovery signals and broadcast the discovery signal thereof (e.g. information thereof such as an identifier thereof) by selecting a channel unused by other D2D UEs in the discovery interval as a discovery channel.

The D2D device having information about neighbor D2D UEs through the discovery interval may configure a connection ID (CID) in order to transmit data to another D2D UE through D2D transmission. In this case, the CID selected for transmission is a CID unused by other D2D UEs. As the CID for transmission is determined, a logical channel for transmitting a transmission request signal and a transmission request response signal between D2D UEs is determined. The transmission request signal (TRS) is a signal transmitted by a D2D UE that desires to perform D2D communication to a neighbor D2D UE and may include information about an identifier thereof, an identifier of a D2D UE receiving the TRS, quality of service (QoS), and a transmit power level. The TRS may be transmitted through a broadcast channel and may be variously referred to as a discovery signal etc. A response to the TRS transmitted by a D2D UE receiving the TRS is the transmission request response signal.

Figure 3:
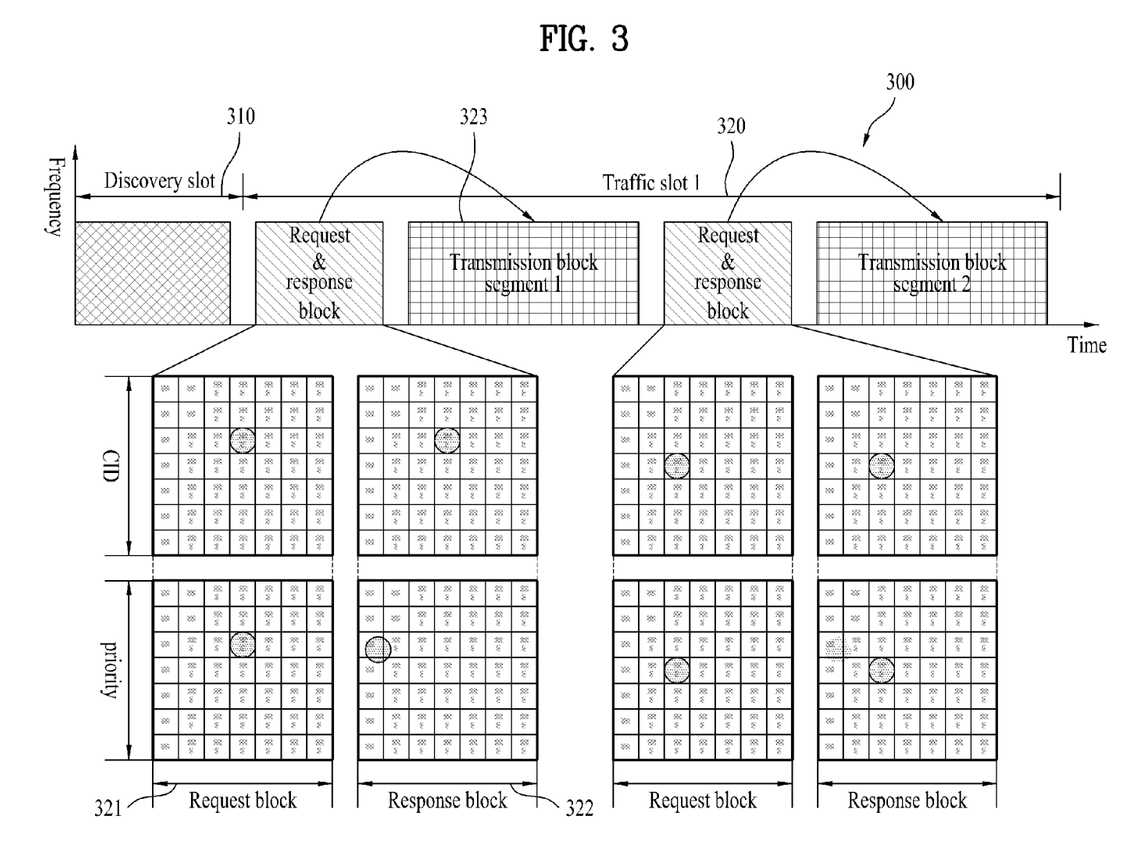
FIG. 3 is a diagram illustrating a D2D frame structure for transmission of a transmission request signal and a transmission request response signal.

FIG. 3 is a diagram illustrating a D2D frame structure for transmission of a transmission request signal and a transmission request response signal.

As illustrated in FIG. 3, a D2D frame structure 300 may include a discovery slot (or discovery interval) 310 and a traffic slot (or traffic interval) 320. The traffic slot may include a transmission request and response block interval including a transmission request block 321 for transmitting a transmission request signal and a transmission response block 322 for transmitting a transmission request response signal and includes a transmission block 323 corresponding to the transmission request and response block interval (321 and 322). As illustrated in FIG. 3, one or more transmission request and response block intervals and one or more transmission blocks corresponding to the transmission request and response block intervals may be present.

In the transmission request and response block interval (321 and 322), a logical channel mapped per CID may be configured in the unit of a single tone and each logical channel may have a determined priority. The logical channel mapped to the CID and the priority of the logical channel may be flexibly changed per transmission block. The priority may have the same average transmission priority opportunity with respect to each D2D UE based on a predetermined duration. For example, when a D2D UE determines C24 as a CID for D2D transmission, the D2D UE may transmit a signal using a logical channel mapped to C24 which is a corresponding CID in the transmission request and response blocks 321 and 322.

A D2D UE may perform D2D transmission through decentralized scheduling and, for this, the D2D UE may transmit a discovery signal and transmission request and response signals using a slot in a frame. In this case, a logical channel used by the D2D UE to discover neighbor D2D UEs and a logical channel used by the D2D UE to transmit the transmission request signal and the transmission request response signal in the transmission block do not overlap with logical channels of other D2D UEs. The D2D UE may recognize whether signals of other D2D UEs are transmitted according to whether signals or power are carried on the logical channels. Accordingly, upon operating in a cellular network, the D2D UE does not receive a control signal from a BS of a corresponding cell, the D2D UE may transmit the discovery signal or the transmission request and transmission request response signals using resources for signal transmission/reception between the BS and the cellular network.

In this way, in the cellular network, since the D2D UE uses the same resource with the cellular, the D2D UE serves as interference in signal transmission of a legacy cellular UE, thereby reducing signal transmission/reception performance between the BS and the cellular UE. In addition, due to overlap of a cellular signal and the discovery signal or the transmission request/transmission request response signal transmitted by the D2D UE, the D2D UE may not correctly receive the discovery signal or transmission request/transmission request response signal or may receive an incorrect signal, thereby having a difficulty in performing D2D transmission.

For example, when D2D peer or D2D UE discovery is performed in the cellular network, the D2D UE uses a resource or channel used to transmit and receive a signal between the BS and the cellular network in a discovery interval due to decentralized scheduling. In this case, since the D2D UE does not receive information about a resource/transmission channel transmitted by the BS, it is difficult to correctly receive discovery signals transmitted by other D2D UEs due to a collision between transmission signals in the corresponding resource/channel.

Further, since the D2D UE broadcasts a discovery signal using a logical channel unused by other D2D UEs, when the cellular network uses all regions corresponding to the discovery interval in the case in which the D2D UE uses the same resource with the cellular network, the D2D UE may have difficulty in obtaining a resource or channel for transmitting the discovery signal and may not perform discovery for D2D transmission.

As another example, upon transmitting the transmission request signal or transmission request response signal in the transmission block, the D2D UE may transmit the transmission request/transmission request response signal using a logical channel/resource (e.g. one tone level) mapped to a CID determined for D2D transmission. In this case, the D2D UE determines D2D transmission by receiving a signal through the logical channel/resource in the transmission block. However, when the D2D UE performs the above operation using the same resource as the cellular UE, interference with the cellular UE may be occur or it may be difficult to efficiently perform D2D transmission due to signaling collision for the same channel and misdetection.

To overcome such a problem, the present invention proposes a method in which a D2D UE in a cellular network transmits and receives data through D2D communication without interfering with the cellular network. Although description will be given of a 3GPP LTE/LTE-A system as an example in the present invention, the method proposed in the present invention is not limited thereto and may be applied to other wireless communication systems such as IEEE 802.

A D2D UE in a cell performs discovery in order to discern whether D2D UEs are present in the vicinity thereof and, for the discovery operation, a BS transmits information about a D2D zone (or D2D region) to D2D UEs in the cell through a broadcast signal. The D2D zone (or D2D region) includes two operation intervals (a discovery interval and a connection interval) and the D2D UE performs discovery during the discovery interval in the D2D zone included in the information received from the BS. Thus, for the discovery operation of the D2D UE, the BS may transmit the information about the D2D zone to the D2D UE using a common search space (CSS) of a downlink broadcast channel (e.g. a physical broadcast channel (PBCH)) or a downlink control channel (e.g. a physical downlink control channel (PDCCH)), an additional broadcast channel for D2D communication, or higher-layer signaling. The information about the D2D zone allocated for the discovery operation of the D2D UE and D2D link establishment may include D2D zone configuration information, D2D zone allocation period information, D2D zone start point information (e.g. in the index unit of subframes, slots, or symbols), D2D zone length information, D2D zone switch information, etc.

Figure 4:
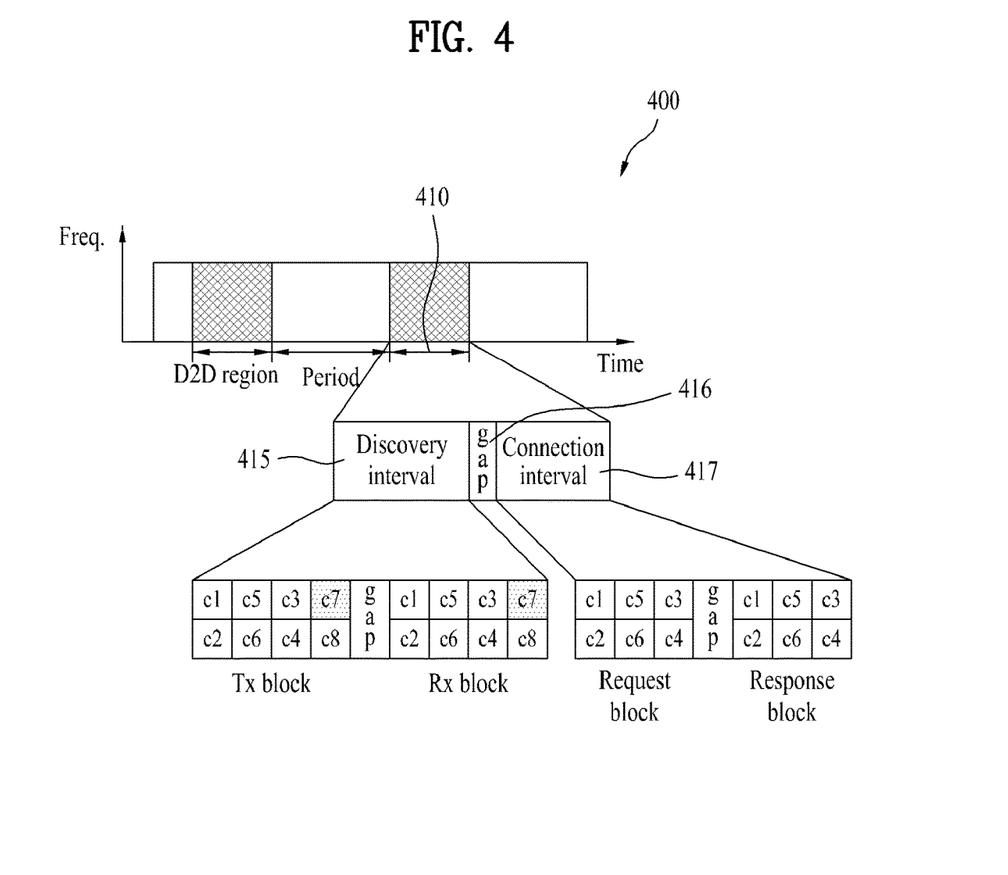
FIG. 4 is a diagram illustrating a frame structure for D2D communication.

An example of a frame structure of the D2D zone allocated by the BS for transmission of the D2D UE is illustrated in FIG. 4.

FIG. 4 is a diagram illustrating a frame structure for D2D communication.

Referring to FIG. 4, a frame structure 400 for D2D communication includes a D2D zone 410. The D2D zone 410 includes a discovery interval 415, a gap 416, and a connection interval 417. The gap 416 is positioned between the discovery interval 415 and the connection interval 417. The discovery interval 415 may include a transmission (Tx) block for transmitting a discovery signal, a gap, and a reception (Rx) block for receiving the discovery signal. The connection interval 417 may include a request block for transmitting a transmission request signal and a response block for transmitting a response signal which is a response to the transmission request signal.

The D2D UE may transmit the transmission request signal for D2D transmission, transmit and receive feedback (or reporting) information for performing D2D communication, and receive scheduling allocation information and resource allocation information for data transmission between D2D UEs, through the connection interval 417 in the allocated D2D zone 410 Accordingly, for signal transmission and reception of the D2D UE in the connection interval 417, the connection interval 417 needs to be separately used as a time or frequency region.

The frame structure illustrated in FIG. 4 may be divided in the frequency domain to perform each operation. In addition, unlike the D2D zone 410 of FIG. 4, the intervals (regions in which operations are to be performed) included in the D2D zone 410 may be flexibly changed at a predetermined period or the D2D zone 410 may be configured with a single interval. For example, when the discovery interval 415 and the connection interval 417 of the D2D zone 410 have different periods, two operation regions may be present in a duration during which the periods of the two intervals are the same but only one operation region may be present in the D2D zone 410 in a duration during which the periods of the two intervals are different.

The D2D UE may perform discovery without receiving interference from the cellular UE or creating interference with respect to the cellular UE using the D2D zone allocated through a CSS of a downlink control channel (e.g. a PBCH or a PDCCH), an additional broadcast channel for D2D communication, or higher layer signaling, thereby efficiently detecting neighbor D2D UEs. In addition, since the D2D zone may be dynamically allocated through signaling, it is possible to properly distribute and allocate resources according to change of an environment and state of a cellular/D2D system and, thus, efficient communication can be performed.

In the case in which the information about the D2D zone is transmitted by the BS through a broadcast signal, cellular UEs in a cell also receive the information about the D2D zone. Upon receiving the information about the D2D zone, a cellular UE measures discovery signals transmitted by D2D UEs in the vicinity of the cellular UE by monitoring the D2D zone while a D2D UE performs discovery through the D2D zone (i.e. during the discovery interval). The cellular UE may detect the neighbor D2D UEs in the vicinity thereof by receiving the discovery signals transmitted by the D2D UEs and discern information of signal interference between the D2D UEs and the cellular UE through received signal power levels of the measured discovery signals.

In this way, the cellular UE composes a neighbor D2D UE list (variously referred to as an adjoining D2D UE list, an adjacent D2D UE list, etc.) or table using D2D UE information (identifier), received signal power, a signal-to-noise ratio (SNR), and interference level information, obtained by receiving the discovery signal transmitted by the D2D UE, and transmits the composed list or table to the BS through an uplink control channel (e.g. a physical uplink control channel (PUCCH)) or an uplink data channel (e.g. a physical uplink shared channel (PUSCH)). The BS may detect D2D UEs in the vicinity of the cellular UE and information about interference through information about neighbor D2D UEs transmitted by the cellular UE.

Meanwhile, as opposed to the above example, cellular UEs which do not perform D2D communication in the D2D zone may enter a micro sleep mode to save power.

Figure 5:
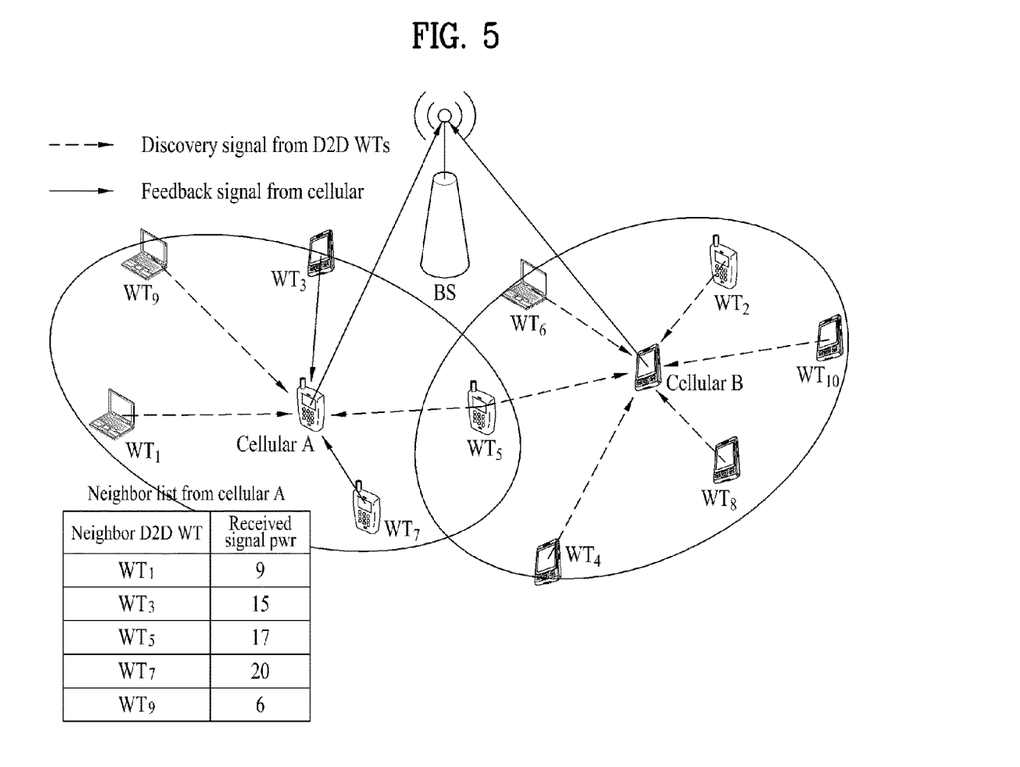
FIG. 5 is a diagram explaining the concept of the operation of a cellular UE for receiving discovery signals transmitted by D2D UEs by monitoring a D2D zone, discerning information about neighbor D2D UEs, and transmitting the information to a BS in a list or table form.

FIG. 5 is a diagram explaining the concept of the operation of a cellular UE for receiving discovery signals transmitted by D2D UEs by monitoring a D2D zone, discerning information about neighbor D2D UEs, and transmitting the information to a BS in list or table form.

As illustrated in FIG. 5, when there are multiple D2D UEs in the vicinity of a cellular UE, the cellular UE may receive and measure the discovery signals of the D2D UEs to obtain information about received signal power levels, SNRs, and interference levels of the measured discovery signals. The cellular UE composes a list or table of neighbor D2D UEs based on the obtained information. Since the composed list or table includes much information about a plurality of neighbor D2D UEs, there is a problem with increase in signaling overhead when this list or table information is transmitted to the BS. Accordingly, to reduce the amount of the list information transmitted by the cellular UE to the BS, the BS may transmit or broadcast a threshold value to the cellular UE so as to transmit only information about D2D UEs satisfying the threshold value in the list or table information.

As illustrated in FIG. 5, a cellular UE A measures discovery signals received from neighboring D2D UEs WT1, WT3, WT5, WT7, and WT9 and composes a list or table of the neighbor D2D UEs using measured values (including at least one of received signal power levels, SNRs, and interference levels). Next, the cellular UE compares information about the list or table of the neighbor D2D UEs with a threshold value transmitted by the BS and recomposes the list by including only D2D UEs having a value exceeding the threshold value (i.e. may be expressed as a received signal power level, an SNR, an interference level, etc.). The cellular UE may transmit the recomposed list to the BS.

For example, assuming that the threshold value received by the cellular UE from the BS is 10, the cellular UE may compose a list or table of neighbor D2D UEs only including WT3, ST5, and WT7 each having a measurement value exceeding the threshold value as illustrated in FIG. 5 so as to include information about fewer D2D UEs than actually measured D2D UEs in the list or table, thereby considerably reducing signaling overhead. Therefore, the cellular UE may compose the list or table using only information about D2D UEs satisfying the threshold value transmitted by the BS so that the information about neighbor D2D UEs can be transmitted to the BS without greatly increasing signaling overhead as compared with a conventional method.

In order for the cellular UE to monitor the D2D zone, the BS may transmit a D2D measurement indicator (i.e. an indicator for monitoring the D2D zone) and the threshold value through higher-layer signaling (e.g. RRC signaling) so that the cellular UE may measure neighbor D2D UEs and compose the list of the neighbor D2D UEs.

Meanwhile, upon receiving information about the D2D zone from the BS, a D2D UE performs discovery through an allocated zone/resource. The D2D UE which has discovered neighbor D2D UEs through a D2D UE discovery operation may transmit a request signal including information about UEs with which D2D communication is desired to be performed, QoS information, bandwidth request (BR) information, etc. to the BS. The BS may establish a D2D link or D2D connection for performing D2D communication using the information received from the D2D UE.

Upon selecting D2D UEs for performing D2D communication, the BS may allocate resources for the D2D link using the information or list of neighbor D2D UEs composed by the cellular UE through monitoring of the D2D zone. That is, when the D2D UEs selected to perform D2D communication are included in the list or table information of the neighbor D2D UEs composed by the cellular UE, the BS allocates, for the D2D link, the other resources (resources of the cellular UE excluding a UE or a UE pair of the D2D link in the information about neighbor D2D UEs transmitted by the cellular UE) except for resources allocated to the cellular UE.

After forming the D2D link and allocating the resources for the link, the BS may transmit information including a D2D transmission confirm indicator, a D2D UE identifier, resource allocation information, reference signal information (e.g. a base sequence index, a cyclic shift value, Tx power, etc.), and a measurement indicator to the D2D UE through downlink signaling. This will be further described with reference to FIG. 6.

Figure 6:
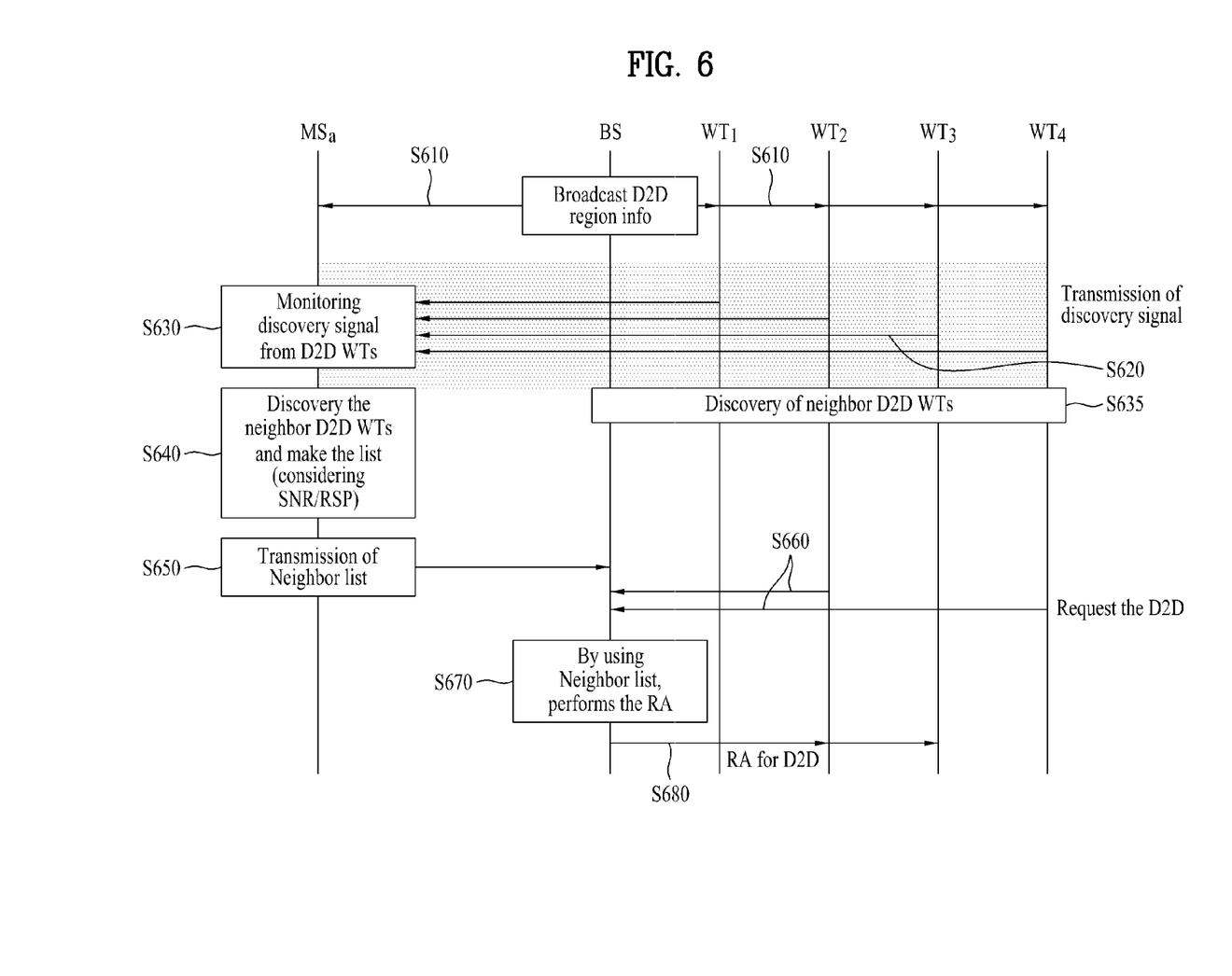
FIG. 6 is a diagram explaining a D2D communication procedure.

FIG. 6 is a diagram explaining a D2D communication procedure.

Referring to FIG. 6, a BS may broadcast D2D zone information to D2D UEs WT1, WT2, WT3, and WT4 as well as a cellular UE (S610). Then, the D2D UEs may transmit discovery signals through a D2D zone according to the D2D zone information (S620). The cellular UE may monitor a discovery signal transmitted by at least one D2D UE (S630). Meanwhile, the D2D UEs WT1, WT2, WT3, and WT4 may also discover neighbor D2D UEs by receiving discovery signals transmitted by other D2D UEs (S635).

The cellular UE may discover neighbor D2D UEs by monitoring a discovery signal transmitted by at least one D2D UE, acquire information about a received signal level, an SNR, and an interference level of the measured discovery signal, and generate neighbor D2D UE list or table based on the acquired information (S640). Next, the cellular UE may transmit the generated neighbor D2D UE list or table information to the BS (S650). Here, the neighbor D2D UE list information generated by the cellular UE includes information about UEs actually performing D2D communication and UEs not performing D2D communication. However, since the UEs not performing D2D communication do not interfere with the cellular UE, the cellular UE does not need to transmit the information about the UEs not performing D2D communication by excluding the information about the UEs not performing D2D communication from the neighbor D2D UE list or table information (S650).

The BS may receive D2D communication request signals from one or more D2D UEs (S660) and allocate resources for the D2D UEs which have requested D2D communication using the neighbor D2D UE list or table information received from the cellular UE (S670). The BS may transmit information about the allocated resources to the D2D UEs which have transmitted the D2D communication request signals (S680).

Meanwhile, unlike the case of FIG. 6, the cellular UE may directly receive D2D communication request signals transmitted by the D2D UEs by monitoring a connection interval of a D2D zone. In order for the cellular UE to receive the D2D communication request signals transmitted by the D2D UEs, the BS may transmit information such as a measurement indicator, discovery zone (or region) information (e.g. a discovery start point (symbol/slot/subframe index)), and discovery zone length to the cellular UE through higher-layer signaling as described above or cause the cellular UE to measure the D2D communication request signal. In this way, the cellular UE may discover neighbor D2D UEs which are to currently perform D2D communication by receiving the D2D communication request signals of the D2D UEs, compose a list of the neighboring D2D UEs, and transmit the list to the BS as information about the D2D UEs. Since the list of the neighbor D2D UEs includes only D2D UEs that desire to perform D2D communication, the unnecessary amount of information is reduced and signaling overhead and resource waste of UEs transmitted to the BS can be reduced.

In the above-described method, the BS allocates resources which do not create interference between the cellular UE and D2D UEs using the list or table of neighbor D2D UEs transmitted by the cellular UE. However, unlike this method, even if the cellular UE and the D2D UE are allocated in the same resource, the BS may reduce interference between the cellular UE and the D2D UE using a transmission scheme. Through the above method, the BS can efficiently transmit and receive signals without interference between the cellular UE and the D2D UE within a restricted resource.

For example, when multiple cellular UEs and D2D UEs request that the BS allocate resources, the BS cannot allocate resources to all UEs. To efficiently use resources and reduce interference between UEs, the BS may cause the cellular UE and the D2D UE to transmit signals in the same resource using a MIMO transmission scheme. That is, the BS allocates the same resource to the cellular UE and the D2D UE in consideration of information about neighbor UEs received from the cellular UE, a resource request of UEs (cellular UEs and D2D UEs), and channel information (e.g. CQI and CSI) and configures an orthogonal precoding matrix index (PMI) (e.g. a codebook index) to transmit and receive signals through the orthogonal PMI. In this case, the PMI configured by the BS may be transmitted by the BS to the D2D UE together with the allocated resource information.

The embodiments described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It will be obvious that claims that do not explicitly cite each other in the appended claims may be presented in combination as an exemplary embodiment of the present invention or included as a new claim by subsequent amendment after the application is filed.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description and all changes coming within the meaning and equivalency range of the appended claims are intended to be embraced therein.

INDUSTRIAL APPLICABILITY

The method for supporting D2D communication in a cellular network and the apparatus therefor are applicable to various communication systems such as 3GPP LTE, LTE-A, and IEEE 802 systems.

The invention claimed is:

1. A method for supporting a device-to-device (D2D) communication by a first D2D device in a cellular network, the method comprising:
   receiving, from a base station, information about a D2D discovery region configured for detecting at least one other D2D device among D2D communication regions, the D2D discovery region being configured by the cellular network;
   receiving, from the base station, information about a D2D scheduling assignment region configured for D2D scheduling assignment;
   wherein the D2D communication regions comprise the D2D discovery region and the D2D scheduling assignment region;
   detecting a discovery signal transmitted from the at least one other D2D device by monitoring the D2D discovery region based on the information about the D2D discovery region; and
   receiving resource assignment information for D2D data transmission through the D2D scheduling assignment region from a second D2D device which has transmitted the detected discovery signal,
   wherein the information about the D2D discovery region includes information associated with a start subframe index of the D2D discovery region configured by the cellular network and time period assignment information of the D2D discovery region, and
   wherein a time period of the D2D discovery region is different from a time period of the D2D scheduling assignment region.

2. The method according to claim 1, further comprising:
   acquiring received signal power information of the discovery signal, signal-to-noise ratio (SNR) information, or interference level information of the discovery signal by measuring the discovery signal transmitted from the at least one other D2D device; and
   generating a list of neighboring D2D devices based on the acquired information.

3. The method according to claim 1, further comprising:
   transmitting scheduling allocation information through a D2D communication region,
   wherein the D2D communication region and the D2D discover region are separately configured with respect to a time resource or a frequency resource.

4. The method according to claim 1, further comprising:
   transmitting, to the second D2D device, D2D data through a D2D data transmission region based on the resource assignment information,
   wherein the D2D communication regions further comprise the D2D data transmission region.

5. The method according to claim 2, further comprising:
   transmitting information about the generated list of the neighboring D2D devices to the base station,
   wherein the information about the list of the neighboring D2D devices includes at least one of an identifier of a D2D device adjacent to the first D2D device, received signal power information of discovery signals transmitted from the neighbor D2D devices, SNR information, or interference level information of the neighbor D2D devices.

6. The method according to claim 2, further comprising:
receiving information about a threshold value of the discovery signal from the base station,
wherein the list of the neighboring D2D devices is generated by further considering the information about the threshold value in addition to the acquired information.

7. The method according to claim 5, wherein the neighbor D2D devices are neighbor D2D devices transmitting transmission request signals to perform the D2D communication.

8. The method according to claim 5, wherein the neighbor D2D devices are devices currently performing the D2D communication.

9. The method according to claim 6, wherein the neighbor D2D devices included in the information about the list of the neighboring D2D devices are D2D devices having a received signal power level, an SNR, or an interference level exceeding the threshold value.

10. A first D2D device for supporting device-to-device (D2D) communication in a cellular network, the first D2D device comprising:
a receiver configured to:
receive, from a base station, information about a D2D discovery region configured for detecting at least one other D2D device, the D2D discovery region being configured by the cellular network; and
receive, from a base station, information about a D2D scheduling assignment region configured for D2D scheduling assignment,
wherein the D2D communication regions comprise the D2D discovery region and the D2D scheduling assignment region; and
a processor configured to detect a discovery signal transmitted from the at least one other D2D device by monitoring the D2D discovery region based on the information about the D2D discovery region,
wherein the receiver is further configured to receive resource assignment information for D2D data transmission through the D2D scheduling assignment region from a second D2D device which has transmitted the detected discovery signal,
wherein the information about the D2D discovery region includes information associated with a start subframe index of the D2D discovery region configured by the cellular network and time period assignment information of the D2D discovery region, and
wherein a time period of the D2D discovery region is different from a time period of the D2D scheduling assignment region.

11. The first D2D device according to claim 10, wherein the processor acquires at least one of received signal power information of the discovery signal, signal-to-noise ratio (SNR) information, or interference level information of the discovery signal by measuring the discovery signal transmitted by the at least one other D2D device, detected in the D2D discovery region and generates a list of neighboring D2D devices based on the acquired information.

12. The first D2D device according to claim 10,
wherein the transmitter is further configured to transmit scheduling allocation information through a D2D communication region,
wherein the D2D communication region and the D2D discover region are separately configured with respect to a time resource or a frequency resource.

13. The first D2D device according to claim 10, further comprising:
a transmitter configured to transmit, to the second D2D device, D2D data through a D2D data transmission region based on the resource assignment information,
wherein the D2D communication regions further comprise the D2D data transmission region.

14. The first D2D device according to claim 11, further comprising:
a transmitter configured to transmit information about the generated list of the neighboring D2D devices to the base station,
wherein the information about the list of the neighboring D2D devices generated by the processor includes at least one of an identifier of a D2D device adjacent to the first D2D device, received signal power information of discovery signals transmitted by the neighbor D2D devices, SNR information, or interference level information of the neighbor D2D devices.

15. The first D2D device according to claim 11,
wherein the receiver is configured to further receive information about a threshold value of the discovery signal from the base station, and
the processor is configured to generate the list of the neighboring D2D devices by further considering the information about the threshold value in addition to the acquired information.

* * * * *